United States Patent [19]

Taylor et al.

[11] 3,727,228

[45] Apr. 10, 1973

[54] AUTOMATED FLAGGER

[76] Inventors: Hugh C. Taylor, P.O. Box 385, Five Points, Calif. 93624; William A. Gunnarson, 1043 Adams, Los Banos, Calif. 93635

[22] Filed: Mar. 28, 1972

[21] Appl. No.: 238,815

[52] U.S. Cl. ................. 343/225, 340/114, 340/321
[51] Int. Cl. ..................... G08b 23/00, H04b 07/00
[58] Field of Search ........................... 343/225, 228; 340/319, 321; 242/129.3, 49

[56] References Cited

UNITED STATES PATENTS 3,117,299  1/1964  Lemm et al. ..................... 343/228 X
3,585,585  6/1971  Grosz ............................... 340/321 X Primary Examiner—Donald J. Yusko
Attorney—Herbert A. Huebner et al.

[57] ABSTRACT

An automated flagger particularly suited for use as a marker in sequentially designating the location of each successive path of a series of paths traversed by an aircraft engaged in so-called crop-dusting activities. The flagger is characterized by a readily detectable, displaceable marker and an intermittently operable, stationary winch attached to the marker and responsive to radio signals for advancing the marker in uniform increments so that the pilot of the aircraft can repeatedly reposition the marker, through a transmission of radio signals, and readily discern the location of each successive path to be followed in making sequential passes over the area.

10 Claims, 6 Drawing Figures

3,727,228

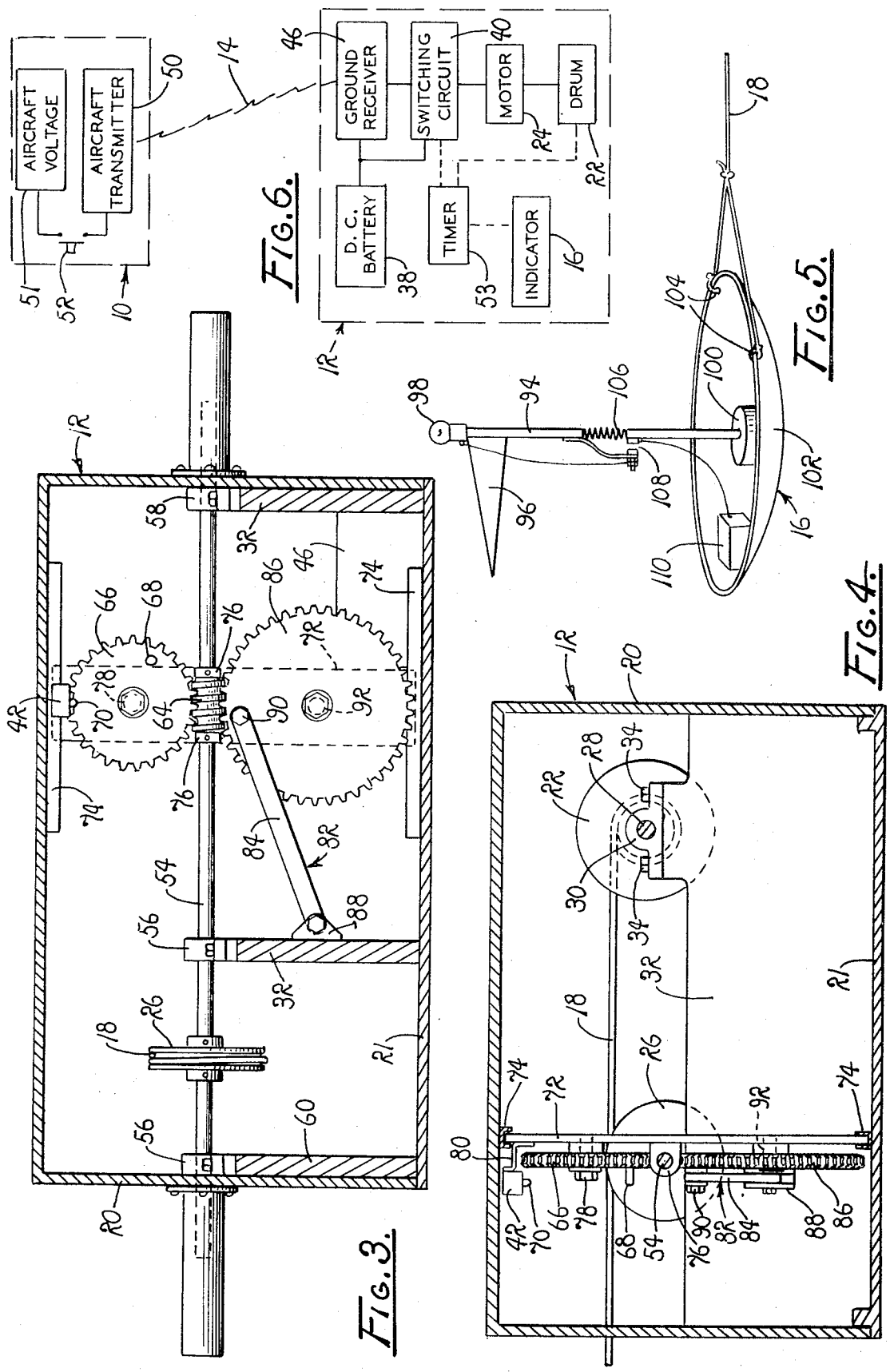

AUTOMATED FLAGGER

BACKGROUND OF THE INVENTION

The invention relates to flaggers for crop-dusting aircraft and more particularly to an automated flagger which repositions itself in response to signals transmitted from an aircraft, for marking sequential paths for successive passes.

Often times, aircraft are employed in agriculture and are utilized to "spray" or "dust" various crops, including field crops and timber, with chemical insecticides, herbicides and the like. In such instances, it is particularly desirable to operate an aircraft in a manner such that it lays down a substantially uniform pattern of spray or dust in order for the operation to be effective in controlling various types of pests including insects and diseases.

In order to achieve the desired uniformity, the employed aircraft is flown in successive passes over a given area following laterally spaced, substantially parallel paths. The spacing between the paths preferably is uniform and is determined, at least in part, by the width of each swath made as the aircraft deposits a stream of dust or spray along the surface of the area being treated. For reasons readily apparent, it is highly desirable for each successive path to be well defined whereby adequate distribution of the spray or dust is achieved as it is deposited.

To achieve this end, it heretofore has been common practice to provide a "flagger" with position indicators and station the flagger in a given relationship with each path to be followed during each pass over the area being treated. As can readily be appreciated by those familiar with crop-dusting activities, a flagger necessarily is subjected to adverse working conditions since he continuously is engulfed in a spray or cloud of chemicals as the chemicals are discharged from the aircraft. This, of course, results in an added economic expense.

The prior art, of course, is replete with fixed markers employed in designating paths for aircraft and the like. Normally, such markers are found in the vicinity of tall obstruction airfields and the like and frequently are utilized in permanently designating certain paths to be followed by aircraft operating in the vicinity. However, due to the fact that such markers serve as permanent fixtures they are totally inappropriate for designating successive paths for crop-dusting aircraft.

In view of the foregoing, it should be apparent that there currently exists a need for a practical and reliable automated flagger which is both economic to fabricate and simple to operate.

OBJECTS AND SUMMARY OF THE INVENTION

It is therefore an object of the instant invention to provide an automated flagger for replacing signalmen in the course of conducting "crop-dusting" operations and the like utilizing low-flying aircraft.

It is another object to provide an automated flagger for aircraft which is repositionable for sequentially designating paths for aircraft performing crop-dusting activities.

It is another object to provide an automated flagger responsive to radio signals transmitted from an aircraft for serially designating the location of each successive path followed by the aircraft in crop-dusting activities.

It is another object to provide a highly reliable, practical and economic automated flagger employable by those engaged in crop-dusting activities for designating the location of each path of a series of paths prior to its being traversed by aircraft engaged in discharging, over given areas, predetermined quantities of dusts, sprays, and the like.

These and other objects and advantages are achieved through the use of an automated flagger including an incrementally displaceable base, having projected therefrom a visually detectable flag and/or source of radiation affixed to its distal end, attached to a line extended from a winch intermittently actuated in response to radio signals received from aircraft engaged in crop-dusting activities for designating each successive path to be followed by the aircraft in depositing swaths of chemical sprays, dusts and the like.

BRIEF DESCRIPTION OF THE DRAWINGS

FIG. 3 is a sectional view taken generally along line 3—3 of FIG. 2.

FIG. 4 is a sectional view taken generally along line 4—4 of FIG. 2.

FIG. 5 is a perspective view of a displaceable marker employed by the system shown in FIG. 1.

FIG. 6 is a diagrammatic view, in single-line, block diagram form, of the system shown in FIG. 1.

DESCRIPTION OF THE PREFERRED EMBODIMENT

Figure 1:
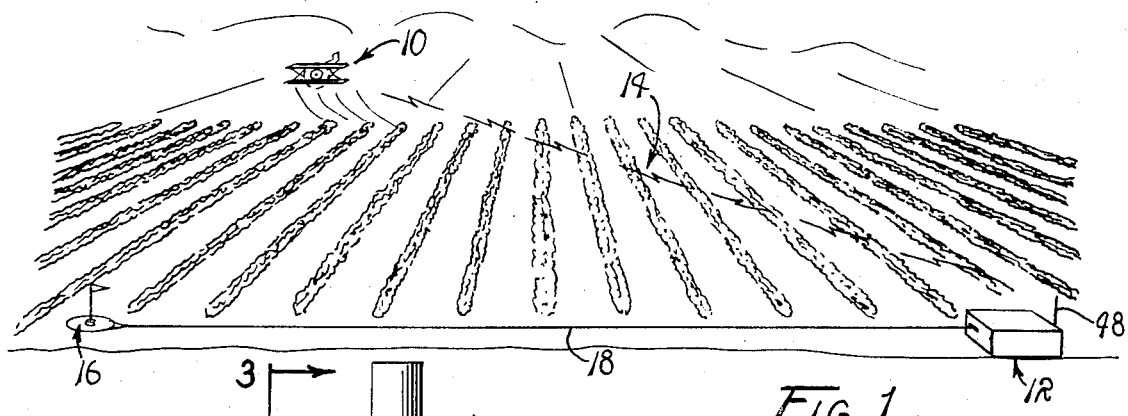
FIG. 1 is a pictorial view of an aircraft engaged in crop-dusting activities depicting relative positions for the aircraft and components of the system which embodies the principles of the instant invention.

Referring now to the drawings wherein like reference numerals designate like or corresponding parts throughout the several views, there is shown in FIG. 1 an aircraft, generally designated 10, coupled with an intermittently operable winch, generally designated 12, through a communication link, generally designated 14. As illustrated, the winch 12 is coupled with a marker, generally designated 16, through a flexible line 18. In operation, the line 18 is retracted, through an actuation of the winch 12, for advancing the marker 16 across a series of paths traversed by the aircraft during crop-dusting operations. It is to be understood that the term "crop-dusting" is employed as a term generic to various similarly conducted activities including spraying, dusting and seeding of fields and timbered areas as well as grasslands and the like.

The winch 12 is housed within a suitable enclosure, generally designated 20. Since the particular enclosure employed is varied, as desired, a detailed description of the enclosure 20 is omitted in the interest of brevity. However, it is to be understood that the enclosure 20 is supported in a stationary or fixed condition by suitable means, not shown. In practice, the enclosure 20 is secured to a rigid base and, in turn, is provided with a base plate 21 of suitable size and strength for supporting thereon a drum 22, a motor 24 and an index sheave 26.

The drum 22 is mounted on a laterally extended axle 28 which, in turn, is supported by a pair of bearing blocks 30 arranged in juxtaposition with the opposite ends of the drum. The bearing blocks 30 are secured to a suitable base 32 fixed to the base plate 21 through the use of suitable structural members, not designated. Preferably, the blocks 30 are mounted on the base 32 by studs 34 screw-threadingly received within internally threaded bores appropriately provided in the base 32. The axle 28 is thus supported for rotation and is coupled with the motor 24 which, when actuated, imparts driven rotation to the drum 22. In practice, the axle 28 is coupled with the motor 24 through a suitable clutch 35. While the specific type of clutch employed is deemed to be a matter of convenience, it is preferred that the clutch be positively engaged as the motor 24 is activated for driving the drum 22 in rotation, for thus winding the line 18 thereabout while being free-running as the line 18 is paid out for positioning the marker 16.

As a practical matter, the output derived from the motor 24 is through an output shaft 36, to which is affixed the clutch 35, so that as driven rotation is imparted to the output shaft, the clutch 35 is activated for thereby imparting rotation to the axle 28 and hence to the drum 22. It will, of course, be appreciated that for the sake of simplicity in design the output of the motor 24 is coaxially aligned with the drum 22. Hence, while not shown, it is to be understood that the motor 24 is fixedly mounted upon an appropriate base, quite similar to the base 32.

The particular motor utilized in driving the drum 22 is varied in accordance with the available facilities and prevailing operational requirements. Therefore, while a D.C. (Direct Current) motor, having high-torque characteristics, is particularly suited for use in driving the drum 22, other motors including appropriately geared synchronous motors, or even gasoline motors, can be effectively employed for this purpose.

Figure 2:
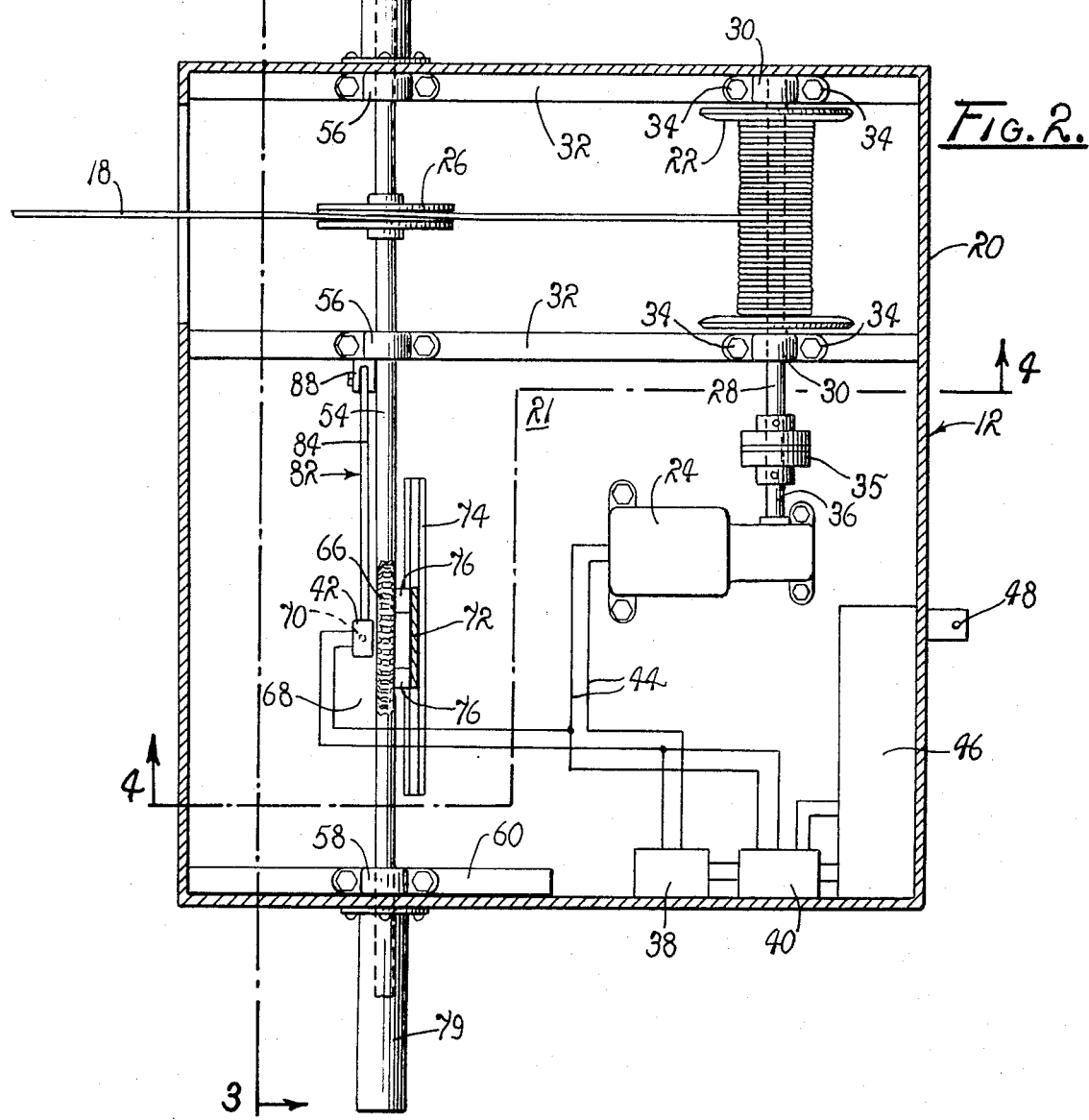
FIG. 2 is a top plan view of a winch employed by the system depicted in FIG. 1.

It is to be understood that the motor 24, as illustrated, is electrically energized from a source of electrical energy, depicted as a D.C. battery, designated 38. The motor 24 is coupled with the battery 38 through a suitable switching circuit 40 which serves to control the operation of the motor by making and breaking an electrical circuit between the motor 24 and the battery 38. As a practical matter, the switching circuit 40 has included therein a microswitch 42 coupled with the motor 24 through one of a plurality of suitable electrical leads 44, FIG. 2, which are employed in selectively applying the voltage across windings of the motor 24, in a manner consistent with known principles of machine design techniques. The function of the switch 42 is to de-energize the motor 24 subsequent to a predetermined duration of activation. It is to be understood that the switching circuit 40 is activated in response to an electrical pulse applied thereto by a ground receiver unit 46 and is thus switched to an energized mode for applying a voltage derived from a battery 38 across the windings of the motor 24 for thus energizing the motor. While not shown, it is to be understood that the switching circuit 40 includes a suitable circuit component which momentarily closes to complete a circuit in response to the applied pulse for applying a voltage across the motor 24, and thereafter opens to interrupt the thus completed circuit. The established energized condition of the motor 24 is maintained through the microswitch 42 until such time as the microswitch is actuated for interrupting the circuit between the motor and the battery, in a manner hereinafter more fully set forth.

The ground receiver 46 is of a suitable design well known to those engaged in the electronic communication field and is provided with an antenna 48. This antenna serves to receive radio or electronic signals transmitted from a radio transmitter 50 located aboard the aircraft 10. As best illustrated in FIG. 6, the transmitter 50 is coupled with a source of aircraft voltage 51 through a control switch 52, preferably of a type including an actuator button mounted on the control stick of the aircraft.

Since the particular components employed in the switching circuit 40, the ground receiver 46 and the transmitter 50 form no specific part of the instant invention and the design of these circuits is well within the skill of the art, a detailed description thereof is omitted in the interest of brevity. However, it is to be understood that the transmitter 50 responds to a manipulation of the switch 52 and transmits electronic signals along the link 14 to the ground receiver 46. Upon receipt of the transmitted signal, at the receiver 46, the receiver 46 is activated and responsively delivers an initiating pulse to the switching circuit 40. The initiating pulse, in turn, serves to momentarily close a suitable circuit component within the switching circuit 40, whereupon a voltage, derived from the battery 38, is applied across the windings of the motor 24 for initiating the operation of the motor 24. Once the motor 24 is activated for driving the drum 22, the microswitch 42 closes so that the energized condition for the motor 24 is maintained through the microswitch. Hence, the motor 24 is energized for a period determined primarily by the duration of the period during which the microswitch 42 remains closed.

In response to the energization of the motor 24, the drum 22 is driven in rotation through the clutch 35 whereupon the line 18 is wound about the drum 22. The duration of the operation of the motor 24 is, in practice, controlled by the index sheave 26 about which the line 18 is passed, as the index sheave 26 serves to provide a motion input to a timer 53, FIG. 6, which is employed to impose a cyclic mode of operation on the microswitch 42.

The sheave 26 is secured to a supporting axle 54 mounted for both linear and angular displacement by a pair of bearing blocks 56, also mounted on the base 32, in a manner similar to that in which the bearing blocks 30 are mounted thereon. The axle 54 is extended through a third bearing block 58 suitably supported by a base 60 located within the enclosure 20. It should readily be apparent that the sheave 26 is rotated as the line 18 is tensioned and wound about the drum 22, due to the fact that one turn of the line 18 is taken about the periphery of the sheave 26.

The axle 54 has affixed thereto, in concentric relationship, a worm gear 64. The worm gear 64 is of a known design and includes a helix, not designated, extending substantially the length thereof. Meshed with the helix of the worm gear 64 there is a timing disk 66 having affixed thereto a laterally extended protuberance 68. Consequently, the protuberance 68 is caused to describe a circular path as the disk 66 is driven through 360° of angular displacement. As illustrated in FIGS. 3 and 4, the microswitch 42 includes a switch actuating button 70 disposed in the path of the protuberance 68 so that the button is depressed upon being engaged by the protuberance for opening the electrical circuit between the battery 38 and the motor 24 for thereby de-energizing the motor.

In practice, the gear ratio established between the worm gear 64 and the timing disk 66 is such that 360° of angular displacement imparted to the sheave 26 and, consequently, 360° of angular displacement imparted to the axle 54 serve to impart 360° of angular displacement to the disk 66 so that the button 70 is actuated once during each 360° of rotation of the sheave 26 for opening the circuit between the battery and the motor. Thus, the length of the line 18 wound about the drum 22 and the distance through which the marker 16 moves during each period of the motor's activation are determined by the circumference of the sheave 26. Therefore, it is possible to advance the marker 16 through uniform increments of travel, regardless of the effective changing diameter of the drum 22 about which the line is wound.

It is preferred that the axle 54 be subjected to rectilinear motion concurrently with its angular displacement in order to cause the sheave 26 to perform a so-called level-wind function as the line 18 is wound about the drum. It is therefore necessary for the timing disk 66 to be moved along a rectilinear path in order to preclude a disengagement thereof with the worm gear 64. In order to accommodate such movement, a carriage 72 is provided and seated in a pair of vertically spaced coplanar tracks 74, FIG. 4, and fixed to the axle 54 through a pair of coaxially related bearings 76 disposed in juxtaposition with the opposite ends of the worm gear 64. The timing disk 66 is affixed to the carriage 72 by a bearing pin 78, while the microswitch 42 is coupled therewith through a suitable bracket 80. The carriage 72 is therefore advanced along a rectilinear path and transports the timing disk 66 for purposes of continuously maintaining an enmeshed relationship between the timing disk 66 and the worm gear 64. A pair of coaxially related fairings 79 is provided in a protective relationship with the opposite ends of the axle 54 for protecting the axle during periods of reciprocation operatively imparted thereto.

Rectilinear motion of the axle 54 is effected through the use of a Pitman linkage, generally designated 82. This linkage includes a Pitman arm 84 pivotally coupled at one end and projected from a worm wheel 86, which also is enmeshed with the worm gear 64. The opposite end of the Pitman arm 84 is pivotally coupled with the base 32 by means of a suitable bracket and pivot coupling 88. As a practical matter, the opposite end of the arm is coupled with the worm wheel 86 through a pivot pin 90 of any convenient design. The worm wheel 86 also is supported by the carriage 72. A bearing pin 92, disposed in parallelism with the bearing pin 78, serves quite satisfactorily for the purpose. Accordingly, it can be appreciated that the timing disk 66 and the worm wheel 86 are supported by the carriage 72 in a coplanar relationship and at opposite sides of the worm gear 64.

Since the base 32 remains stationary, relative to the housing, rotation of the worm gear 64 causes the pivot pin 90 to describe a circular path whereupon rectilinear motion is imparted to the carriage 72 for thereby maintaining the worm wheel 86 and the timing disk 66 in continuous enmeshed engagement with the worm gear as concurrent angular and rectilinear displacement is imparted to the axle for simultaneously assuring that a proper placement of the line on the drum 22 is achieved and an increment of travel is imparted to the marker 16 affixed to the end of the line 18.

For enhancing detection of the marker 16, there is provided a staff 94, preferably of a flexible construction surmounted by a flag 96 and, if desired, a light 98. The staff 94 is seated in a suitable support 100, FIG. 5, mounted on a movable, saucer-shaped base 102 to which the line 18 is attached at mutually spaced points 104. Because of its saucer-shaped or convex disk configuration, the base 102 can readily avoid various impediments and obstructions indigenous to the environment in which the flagger is employed.

Of course, the staff 94 can be fabricated from plexiglass or similar material. Further, it is possible to employ a helical spring 106 as an intermediate section for the staff whereby the flag 96 and light 98 achieve an oscillatory motion as the base 102 is advanced. The purpose of accommodating an oscillatory motion of the flag and light is to accommodate ready recognition of movement by the pilot, preparatory to his making a pass. Due to the fact that "dusting" frequently is performed at night, the light 98 can be intermittently energized for emitting radiation in a "blinking" manner. To achieve this, a pair of switch contacts 108 are interposed between the light 98 and a voltage source or D.C. battery 110. Therefore, it should readily be apparent that as the line 18 is wound about the drum 22 for advancing the base 102 of the marker 16, the spring 106 permits the staff to undergo deflection whereupon the contacts 108 are intermittently engaged and the light 98 is intermittently energized.

Accordingly, it is preferred that the light 98 be permitted to blink only in the event the marker 16 is being advanced by the winch 12 so that a pilot readily is made aware of the fact that the marker 16 is being advanced in response to a signal transmitted from the transmitter 50. In such instances, the staff 94 is sufficiently rigid that the contacts 108 will not be closed so long as the marker 16 remains stationary, but sufficiently flexible that the contacts repeatedly open and close in response to a flexing of the staff 94, as the base 102 is advanced. Thus, a pilot will observe a continuous light when the marker 16 is at rest and will observe a blinking light as the marker is being moved between successive positions.

OPERATION

It is believed that in view of the foregoing description, the operation of the device will be readily understood and it will be briefly reviewed at this point.

With the flagger of the instant invention assembled in a manner hereinbefore described and positioned adjacent to one end of a field or similar area to be dusted or sprayed by an aircraft, the pilot of the aircraft manipulates the switch 52 for thereby activating the transmitter 50. Upon being activated, the transmitter 50 delivers an output signal at the antenna 48 of the receiver 46. This signal is employed in initiating an output applied to the switching signal circuit 40 for momentarily applying a voltage across the motor 24 whereupon the motor is momentarily energized. Once the motor 24 has been energized, the protuberance 68 is advanced and removed from engagement with the button 70 of the microswitch 42 for permitting a circuit to close between the battery 38 and the motor 24, whereby the motor is coupled with the battery 38 through the microswitch. The drum 22 of the winch 12 is thus activated for drawing-in or retracting the line 18. This retraction of the line serves to advance the marker 16 along the surface of the ground to a position for marking the path of the pilot's next pass. As the marker 16 is advanced, the staff 94 is flexed so that the pilot is made aware of movement of the base 102 as the marker 16 is advanced to its next position.

As the line 18 is wound about the drum 22, the index sheave 26 is responsively rotated for driving the axle 54 in angular displacement. Rotation, or angular displacement, of the axle 54 drives the timing disk 66, through the worm gear 64, in rotation for thereby advancing the protuberance 68 through the remaining portion of its circular path and into switch-opening engagement with the switch actuating button 70 of the microswitch 42. Thus, the protuberance again opens the circuit between the battery and the motor 24 so that the motor 24 is again de-energized and the marker 16 permitted to come to rest.

Concurrently with the rotation of the drum 22, the index sheave 26 also is displaced in axial directions for effecting a level-winding of the line 18 about the drum 22. This displacement is accommodated by the carriage 72 as the worm wheel 86 is driven in rotation in response to the angular displacement of the worm gear 64 and is achieved through the Pitman arm 84 which imparts rectilinear motion to the carriage 72 to which the worm wheel 86 is fixed. As the carriage is reciprocated, the coplanar tracks 74 support the carriage against rotation.

The aforedescribed cycle is again initiated by a closing of the switch 52 within the aircraft 10 whereupon the motor 24 again is energized for taking up the line 18, at the drum 22, for a period determined by the peripheral dimension of the index sheave 26 and the length of the path described by the protuberance 68 as the timing disk 66 is driven in rotation.

While the invention herein described has particular utility in operations wherein aircraft normally are employed, it is to be understood that the invention is readily employable in any activity wherein a marker is to be incrementally advanced along the surface of a given area. For example, the described embodiment of the invention can be employed for identifying paths to be traversed by tractors and the like engaged in performing various types of agricultural functions.

In view of the foregoing, it should readily be apparent that the automated flagger of the instant invention provides a practical solution to the problem of successively designating adjacent paths of a series of paths to be followed by aircraft during crop-dusting and similar operations.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. An automated flagger for aircraft engaged in activities wherein the aircraft is caused to over-fly a series of paths extended in parallelism across a given area comprising:
   A. a marker for sequentially designating the location of each path of said series of paths; and
   B. means responsive to electrical signals for successively repositioning said marker.

2. The flagger of claim 1 wherein said marker includes a displaceable base, a staff upwardly projected from the base and a visually detectable flag affixed to the distal end thereof.

3. The flagger of claim 1 wherein said marker includes a displaceable base, a staff formed of a flexible material upwardly projected from the base, and a radiation emitter affixed to the distal end of said staff.

4. The flagger of claim 1 wherein said means for repositioning said marker comprises:
   A. a fixed base;
   B. a winch mounted on said base including a drum and an intermittently operable drive train for imparting intermittent driven rotation to said drum;
   C. a line extended from said marker and attached to the drum of said winch, whereby the line is incrementally wound about the drum as rotation is intermittently imparted thereto; and
   D. control means coupled with said drive train for controlling the operation thereof.

5. The flagger of claim 4 wherein said control means includes a signal transmitter mounted aboard the aircraft, a signal receiver mounted on said base, a switching circuit connected with said receiver and said drive train, including means responsive to a received signal for activating the drive train.

6. The flagger of claim 5 wherein said control means further includes timing means coupled with said drive train for deactivating the drive train at the expiration of a predetermined period of activation.

7. The flagger of claim 6 wherein said timing means comprises:
   A. a sheave of a preselected diameter supported for intermittent rotation between said winch and said marker and having said line trained about the periphery thereof, whereby linear displacement of a preselected length of said line serves to drive said sheave through a complete revolution of angular displacement as the line is wound about the drum;
   B. sheave support means including an axle and means securing said sheave to said axle, whereby the axle is driven in concurrent angular displacement with said sheave, bearing means supporting said axle for simultaneous angular and linear displacement, and means responsive to angular displacement of said sheave for cyclically imparting rectilinear motion to said axle; and
   C. means responsive to an angular displacement of said sheave for interrupting said switching circuit, including a rotatable timing disk having peripheral teeth, drive means having a worm gear mounted on the axle and meshed with the teeth for driving said disk in rotation, a protuberance projected from the disk adapted to describe a circular path as rotation is imparted to the disk, and an actuatable microswitch connected within said switching circuit, including a switch actuator interposed in the path described by said protuberance and engaged thereby as the disk is driven in rotation, whereby the switch is actuated once for each revolution of said sheave.

8. The flagger of claim 7 wherein said means for cyclically imparting rectilinear motion to said axle includes:
A. a worm wheel meshed with said worm gear and supported for rectilinear motion along a path paralleling the longitudinal axis of said axle; and
B. a Pitman arm having one end thereof pivotally fixed to said first worm wheel near the periphery thereof and the opposite end thereof pivotally coupled with said bearing support, whereby rotary motion imparted to said sheave as the line is wound about said drum is converted to rectilinear motion and imparted to said axle.

9. An automated flagger for vehicles engaged in activities wherein a vehicle is caused to traverse a series of substantially parallel paths, comprising a marker and means responsive to radio signals transmitted from the vehicle for imparting uniform increments of travel to said marker.

10. The flagger of claim 9 wherein said means includes a line attached to the marker, means including a winch for retracting the line, and means including an index sheave about which the line is wound for controlling the length of the increments of travel imparted to the marker.

* * * * *